US009442804B2

(12) United States Patent
Garza et al.

(10) Patent No.: US 9,442,804 B2
(45) Date of Patent: Sep. 13, 2016

(54) MESSAGE RECONCILIATION DURING DISASTER RECOVERY (71) Applicant: GLOBALFOUNDRIES INC., GRAND CAYMAN (KY)

(72) Inventors: Jose E. Garza, Richmond (GB); Stephen J. Hobson, Hampton (GB)

(73) Assignee: GLOBALFOUNDRIES Inc., Grand Cayman (KY)

( * ) Notice: Subject to any disclaimer, the term of this patent is extended or adjusted under 35 U.S.C. 154(b) by 169 days.

(21) Appl. No.: 14/344,629

(22) PCT Filed: Oct. 25, 2012

(86) PCT No.: PCT/IB2012/055869
§ 371 (c)(1),
(2) Date: Mar. 13, 2014

(87) PCT Pub. No.: WO2013/064947
PCT Pub. Date: May 10, 2013

(65) Prior Publication Data
US 2014/0372800 A1     Dec. 18, 2014

(30) Foreign Application Priority Data

Nov. 2, 2011 (GB) .................................. 1118936.2

(51) Int. Cl.
*G06F 11/00* (2006.01)
*G06F 11/14* (2006.01)
*G06F 11/20* (2006.01)

(52) U.S. Cl.
CPC ....... *G06F 11/1448* (2013.01); *G06F 11/2097* (2013.01); *G06F 11/2094* (2013.01); *G06F2201/805* (2013.01); *G06F 2201/82* (2013.01); *G06F 2201/84* (2013.01); *G06F 2201/855* (2013.01)

(58) Field of Classification Search
CPC .......... G06F 11/1448; G06F 11/2097; G06F 11/1456; G06F 11/1469; G06F 11/2074
See application file for complete search history.

(56) References Cited

U.S. PATENT DOCUMENTS 6,163,856 A   12/2000 Dion et al.
6,823,349 B1  11/2004 Taylor et al.
(Continued)

FOREIGN PATENT DOCUMENTS

CN    1690974 A   11/2005
CN    1900914 A    1/2007
(Continued)

OTHER PUBLICATIONS

Atwood, Sheri, "The Technology of Disaster Recovery", Veritas Architect Network, Oct. 8, 2003, 12 pages.
(Continued)

*Primary Examiner* — Philip Guyton
(74) *Attorney, Agent, or Firm* — Thompson Hine LLP (57) ABSTRACT A mechanism is provided for message reconciliation during disaster recovery in an asynchronous replication system. A message is intercepted at a gateway remote from a primary data center to which the message is being sent. A copy of the message request is stored in a request message history remotely from the primary data center. The message is forwarded to the primary data center. A transaction history of the message request is stored at the primary data center which is mirrored to a disaster recovery site with other data from the primary data center. In response to determining that the primary data center has failed, messages in the request message history are compared with messages in the transaction history as retrieved from the disaster recovery site.

16 Claims, 5 Drawing Sheets

(56) References Cited

U.S. PATENT DOCUMENTS

| | | |
|---|---|---|
| 7,096,382 B2 * | 8/2006 | Novick .................... 714/20 |
| 7,246,258 B2 | 7/2007 | Chen et al. |
| 7,383,463 B2 | 6/2008 | Hayden et al. |
| 7,464,126 B2 | 12/2008 | Chen |
| 7,543,181 B2 | 6/2009 | Buxton et al. |
| 7,644,300 B1 | 1/2010 | Rao |
| 7,925,623 B2 * | 4/2011 | Therrien et al. .............. 707/610 |
| 2005/0246575 A1 | 11/2005 | Chen et al. |
| 2006/0004830 A1 | 1/2006 | Lora et al. |
| 2008/0209258 A1 | 8/2008 | Casale et al. |
| 2009/0019096 A1 | 1/2009 | Kern et al. |
| 2013/0007219 A1 * | 1/2013 | Sorenson et al. ............ 709/219 |

FOREIGN PATENT DOCUMENTS

| | | |
|---|---|---|
| CN | 101183377 A | 5/2008 |
| JP | 2002-049517 A | 2/2002 |
| JP | 2002-189746 | 7/2002 |
| JP | 2004-221880 | 8/2004 |
| WO | WO2011/015970 A1 | 2/2011 |
| WO | WO2013/064947 A1 | 5/2013 |

OTHER PUBLICATIONS

Bertman, Jeffrey et al., "High Availability and Disaster Recovery—Oracle 10G & 9I Advanced Features Versus the Competition", http://www.pdf-repo.com/pdf_1a/1170g1o87m9526c2da6.html, Copyright 2005-2006, 63 pages.

Patterson, Hugo et al., "SnapMirror: File System Based Asynchronous Mirroring for Disaster Recovery", Proceedings of the FAST 2002 Conference on File and Storage Technologies, Monterey, California, Jan. 28-30, 2002, 13 pages.

Chinese Patent Office, Search Report issued in corresponding Application No. 2012800519277.7 dated Oct. 16, 2015, 2 pages.

* cited by examiner

MESSAGE RECONCILIATION DURING DISASTER RECOVERY

BACKGROUND

This invention relates to the field of message reconciliation during disaster recovery. In particular, the invention relates to simplifying manual message reconciliation during disaster recovery.

A major disruption that results in a full data centre loss can severely impact a company's ability to conduct its business. Many companies protect themselves against such risk by keeping alternative data centres, usually called Disaster Recovery (DR) sites.

It is not uncommon for the distance between primary and DR sites to be 100 miles or more; this is to ensure that the DR site is not affected by a wide-scale disruption that disables the primary site.

Should the primary data centre fail, the DR site is brought up online and takes over from the primary. For this to work, the DR site must have access to a current copy of the business data. Therefore, as the primary data centre runs, data must be sent to the remote site.

In the past, this was done by taking a copy of the data on magnetic tape, and physically taking the tapes to the DR site, at daily or weekly intervals. Today, modern disks automatically propagate (mirror) any updates to a remote site, so it is possible for the business data at the DR site to be up-to-date to an arbitrary degree. As applications write to disk, the disk controller automatically propagates the updates to DR site mirror disks.

There are two ways of doing the propagation:
Synchronous: each write operation on the primary site completes (as seen by the writing application) only after the data has been successfully written to the DR site.
Asynchronous: the write operation completes when the data is written locally. The data is propagated later.

Synchronous mirroring has the problem that the remote site is always up-to-date, but the disk response time to applications is very high, averaging, typically, 25 milliseconds (this is very slow, and similar to response times of the early 1980's). Only when transaction rates are very low can an installation afford to use this option. Asynchronous replication does not cause a performance problem, as typical response times on modern disks will be less than 1 millisecond, thus allowing high transaction volumes. However, when data is transferred asynchronously, the DR site may fall behind the primary. This creates problems when the primary site fails, as the data can not be trusted to be up to date. Any data not transmitted is, effectively, lost. For example, customers have reported that, if the system fails whilst processing 300 transactions per second, the DR site loses a minimum of 10 seconds worth of transaction data. This means having to investigate and re-process, mostly manually, at least 3000 transactions. This process is normally called "manual reconciliation".

Manual reconciliation is notoriously difficult: when operations are switched to a DR site, it is not possible to know how much of the data is missing. Generally, this entails contacting each user and asking them to verify which transactions had been submitted at the time of the outage. Users then have to inspect their local transaction logs and compare them against the data in the DR site, to identify which transactions have to be re-submitted. In other words, the problem is not just that (say) 3000 transactions need re-submitting, but that it is not known which those transactions are. In many cases, it is not possible to resume service before identifying and resolving any missing transactions. This results in a service outage of many hours.

Asynchronous replication provides good performance but results in unreliable/out-dated data at the remote site. Synchronous replication addresses the data integrity problem, but makes the system so slow it is rarely an acceptable solution.

Therefore, there is a need in the art to address the aforementioned problem.

SUMMARY

In one illustrative embodiment, a method, in a data processing system, is provided for message reconciliation during disaster recovery in an asynchronous replication system, comprising: intercepting a message at a gateway remote from a primary data centre to which the message is being sent; storing a copy of the message in a request message history remotely from the primary data centre; forwarding the message to the primary data centre; storing a transaction history of the message at the primary data centre which is mirrored to a disaster recovery site with other data from the primary data centre; and in response to determining that the primary data centre has failed, comparing messages in the request message history with messages in the transaction history as retrieved from the disaster recovery site.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are described which simplify the manual reconciliation effort when using asynchronous replication. The described solution helps to minimize the amount of manual reconciliation needed during disaster recovery. It applies to message-driven work, where a request message is received, a database updated and, optionally, a reply sent.

Figure 1:
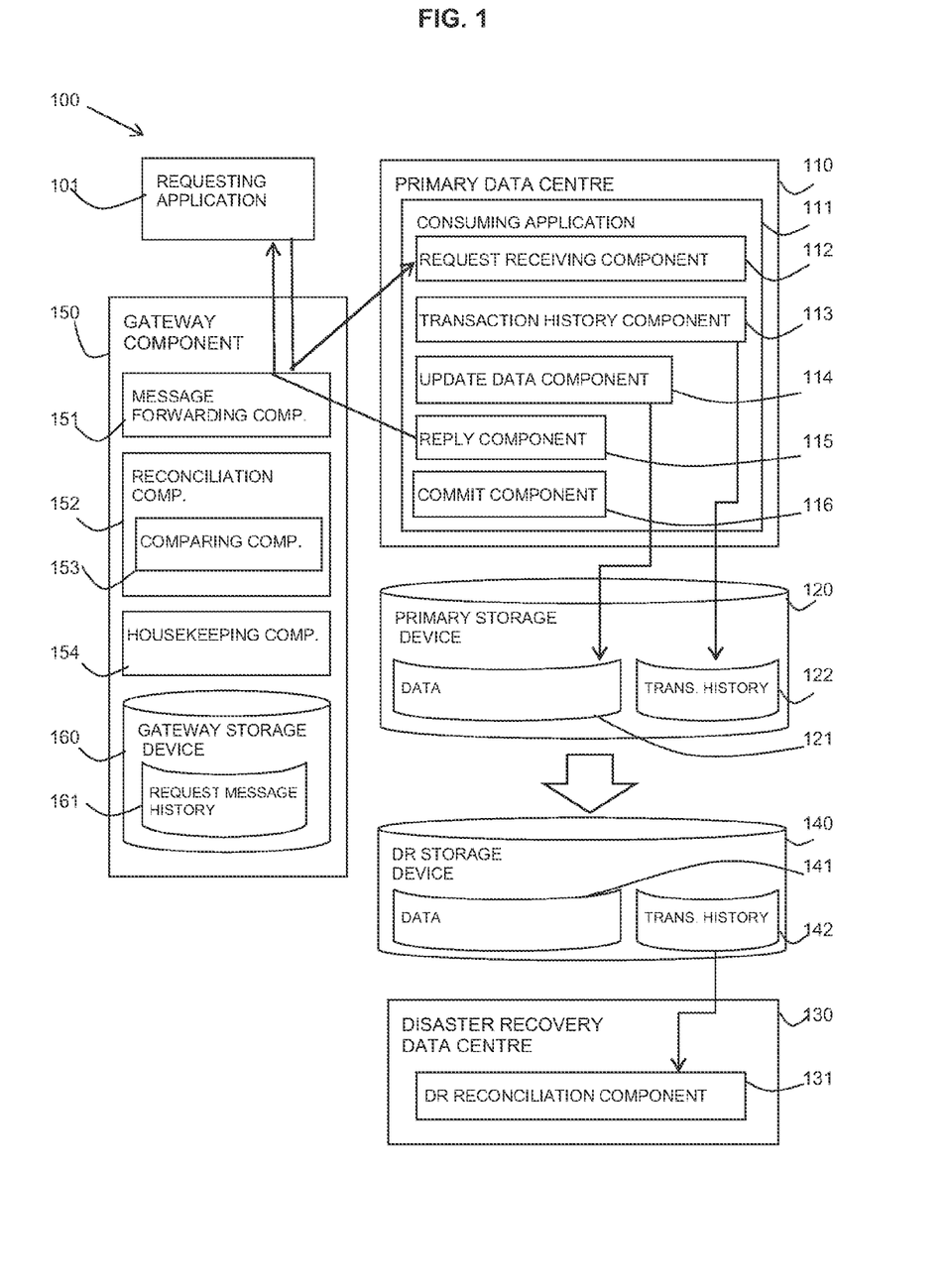
FIG. 1 is a block diagram of an embodiment of a system in accordance with the present invention.

Referring to FIG. 1, a block diagram shows an embodiment of the described system 100.

A primary data centre 110 is provided which receives request messages from a requesting application 101 to update data of a consuming application 111 at the primary data centre 110 (for example, database tables, queues, etc.). A primary storage device 120 of the primary data centre 110 may be updated in response to the request message and, optionally, a reply may be sent to the requesting application 101.

A disaster recovery (DR) data centre 130 is provided remotely from the primary data centre 110 at a disaster recovery site. The disaster recovery data centre 130 has a disaster recovery storage device 140 which has mirror disks of the primary data centre storage device 120.

Asynchronous propagation of writes to the primary storage device 120 is made to the disaster recovery storage device 140.

In the described system, a gateway component 150 is provided to which messages from the requesting application 101 are sent instead of being sent directly to a consuming application 111 at the primary data centre 110. The gateway component 150 runs in a separate data centre from the primary data centre 110. The gateway component 150 is located away from the (primary data centre 110 at a location where it will not be affected by a wide-scale disruption that disables the primary data centre 110. In one embodiment, the gateway component 150 may be located at the disaster recovery site.

The gateway component 150 may include a message forwarding component 151. When a request message arrives at the message forwarding component 151 of the gateway component 150, a copy of the message is saved in persistent storage of a gateway storage device 160 in a request message history 161 (for example, as a database table, a message queue, or a file) before the message is forwarded to its consuming application 111 which is running at the primary data centre 110.

The consuming application 111 at the primary data centre 110 may include a request receiving component 112 for receiving a message request from a requesting application 101 via the message forwarding component 151 of the gateway component 150. The consuming application 111 may include or be in communication with an update data component 114 for updating data 121 in the primary storage device 120 in response to the message request. The consuming application 111 may also include or be in communication with a transaction history component 113 for updating a transaction history 122 (for example, in the form of a database table), which keeps track of each message processed by the primary data centre 110. This data 121 and transaction history 122 may be updated transactionally, and is propagated to the disaster recovery site as part of the mirroring mechanism. That is, data 121 and transaction history 122 may be propagated to data 141 and transaction history 142 in disaster recovery storage device 140 as part of the mirroring mechanism.

The consuming application 111 may also include a reply component 115 for replying to the requesting application 101 which may be via the message forwarding component 151 of the gateway component 150 and a commit component 116 for the consuming application 111 to commit a transaction.

The gateway component 150 may also include a reconciliation component 152 providing reconciliation functionality when a primary data centre 110 fails. A DR reconciliation component 131 may be provided at the DR data centre 130 which provides information from the transaction history 142 stored at the DR storage device 140 which may be compared by a comparing component 153 of the reconciliation component 152 to the request message history 161.

The gateway component 150 may also include a housekeeping component 154 to clear out expired data from the request message history 161.

Figure 2:
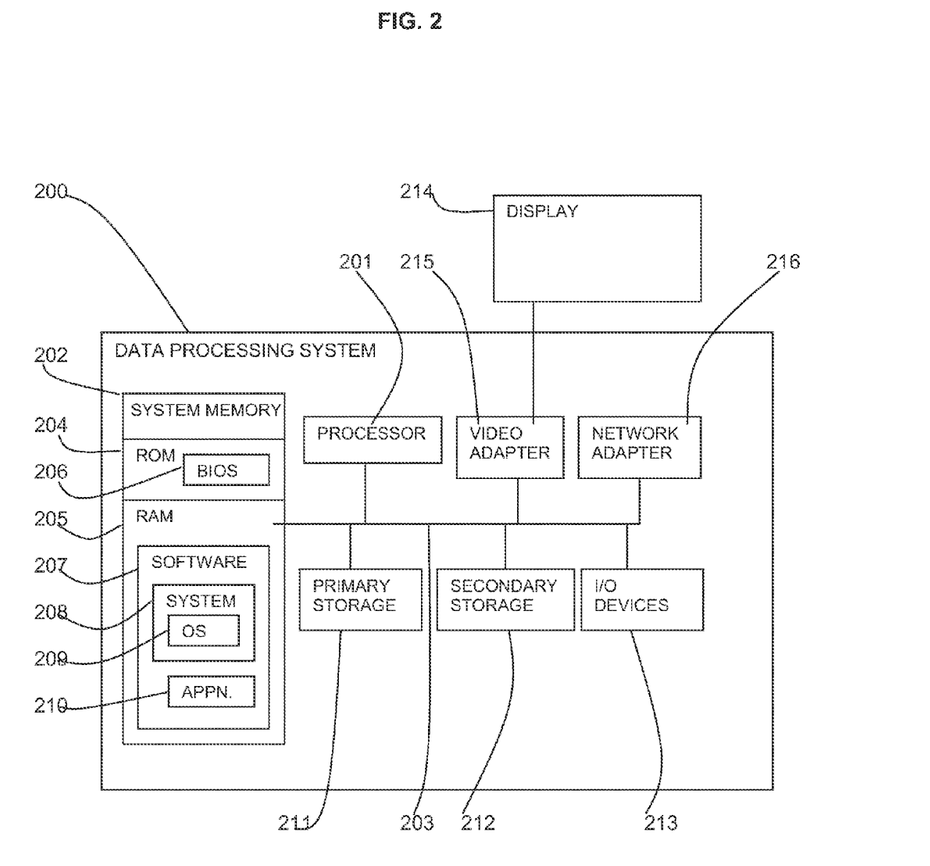
FIG. 2 is a block diagram of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 209 in system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
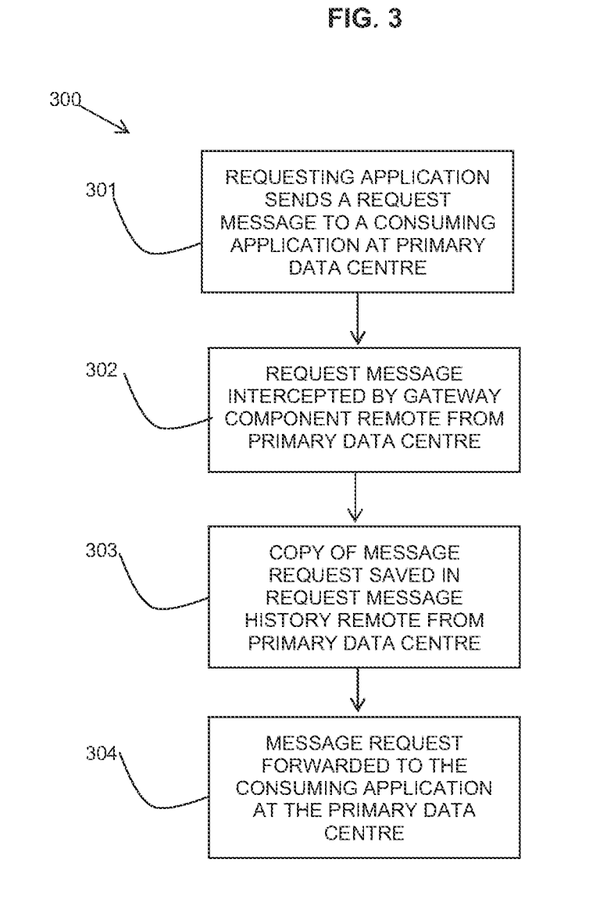
FIGS. 3 to 5 are flow diagrams of embodiments of aspects of a method in accordance with the present invention.

Referring to FIG. 3, a flow diagram 300 shows an embodiment of an aspect of the described method. A requesting application may send 301 a request message to a consuming application at a primary data centre. The request message may be intercepted 302 at a gateway component remote from the primary data centre. A copy of the message request may be saved 303 in a request message history database or list which is also held remotely from the primary data centre. The request message history may include a time record of the request. The message request may then be forwarded 304 to the consuming application at the primary data centre.

Optionally, messages in the request message history database may be removed when they are older than a pre-defined age.

Figure 4:
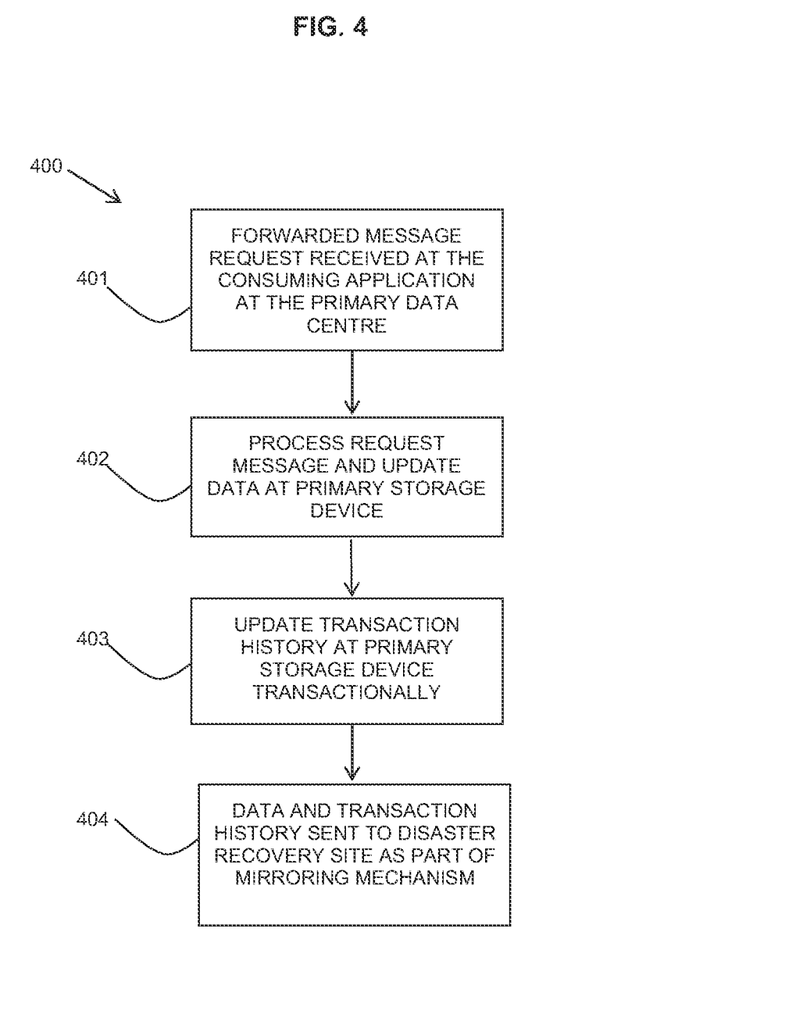

Referring to FIG. 4, a flow diagram 400 shows an embodiment of an aspect of the described method. A forwarded request message may be received 401 from the gateway component at the primary data centre. The request message may be processed 402 and updates made to the data in the primary storage device of the primary data centre. A transaction history database or list at the primary data centre may be updated 403 transactionally. The transaction history may be sent to the disaster recovery site as party of the mirroring mechanism 404 together with other data from the primary storage device.

Figure 5:
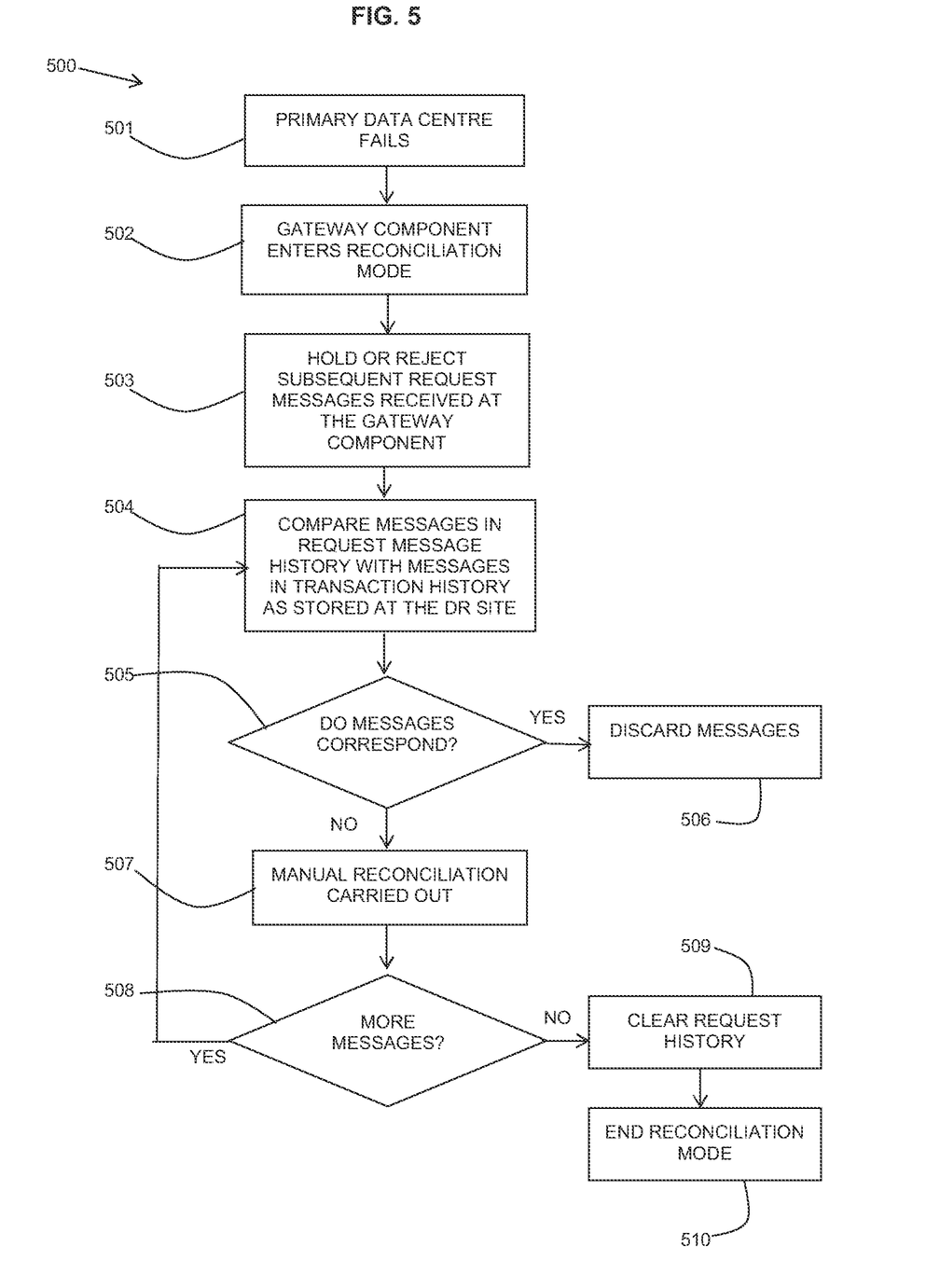

Referring to FIG. 5, a flow diagram 500 shows an embodiment of an aspect of the described method. When a primary data centre fails 501, a gateway component may be notified 502 and may enter a reconciliation mode.

Any request messages that subsequently arrive at the gateway component may be held 503 and not forwarded to the consuming application at the primary data centre. Alternatively, the gateway component may simply reject 503 request messages until the end of the reconciliation mode.

The messages stored in the request message history at the gateway component are compared 504 with entries in the transaction history as stored at the disaster recovery site. It is determined 505 if messages correspond. If they correspond, they can be safely discarded 506 as this request was processed and its data propagated to the disaster recovery site.

If messages do not correspond, the message in the request message history for which there is no corresponding entry in the transaction history may be sent for manual reconciliation 507. This request may have been processed at the primary data centre, but its data was not propagated to the disaster recovery site.

It is determined 508 if there are any more messages in the request history. When all messages in the request history have been processed, the request history may be cleared 509.

The gateway component may end 510 the reconciliation mode and, as it is assumed that the primary data centre is not operational, may forward incoming requests to the consuming application at the disaster recovery site.

The described method relies on the ability to correlate entries in the request message history with entries in the transaction history. This may be achieved by assigning unique message identifiers to messages which is a known technique in messaging systems.

The described method and system simplify the reconciliation process by quickly identifying which messages have to be examined to decide whether they need re-submitting. It may still be necessary to contact users to resolve transactions, but, instead of saying "any transactions you submitted before 10:00 may have been lost", it is possible to provide the users with a list of messages that need attention. This considerably narrows the number of suspect transactions and the time to identify them, which, in turn, shortens the time to resume service.

If transactions have to be re-submitted, the request messages are readily available for re-sending. Without the described system, users need to re-run applications, or fill in browser forms, etc. These actions are not only time consuming but error prone, and introduce the problem of sending the wrong information. For example, a payment for £1986 may be resent as £1896, a typical mistake when working under pressure (as no doubt will be the case following a data centre outage).

Entries in the request message history and rows in the transaction history will accumulate and will have to be "pruned"; a proposed process for pruning is described below.

A time-initiated housekeeping process may be carried out in the gateway component that removes from the request message history all messages older than an arbitrary age.

To remove old entries from the transaction history, there are two options:
1) A time-initiated process runs in the primary data centre which deletes old entries; or
2) The gateway component housekeeping process connects as a client to the primary data centre database and deletes both old request message history entries and transaction history table rows. These deletes are "lazy", so it is not necessary or advisable for these operations to be performed as two-phase commit transaction.

The described method and system exploit known asynchronous mirroring technology to maintain a self-consistent backup of transactions at the remote disaster recovery site. A transaction history records which business transactions have and have not been executed against the two copies of the database.

The described method and system explicitly uses the transactional semantics of the database access method(s). For example, transactional semantics guarantee that for any message either (a) all updates for the message are completed and the message appears in the transaction history database table or (b) no updates for the message have been done and the message does not appear in the transaction history database table.

Note that the described method does not indicate that items which have not yet been deleted are definitely necessary for recovery, only that some items are no longer necessary and can be deleted. The described method is intended to handle transactions which are not idempotent so that it is essential to identify exactly those items (request messages) which the remote database copy shows as complete (and which must therefore not be applied again). This is achieved by exploiting transactional semantics to ensure that processing the message updates the database and updates the transaction history database table atomically (both happen or neither happens).

The invention can take the form of an entirety hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method, in a data processing system, for message reconciliation during disaster recovery in an asynchronous replication system, the method comprising:
   intercepting a plurality of messages at a gateway remote from a primary data center to which the messages are being sent;
   storing a copy of each of the messages in a request message history that is remote from the primary data center;
   forwarding the messages to the primary data center;
   updating a transaction history at the primary data center to indicate each message that has been processed by the primary data center, wherein the transaction history at the primary data center is mirrored to at least one storage device at a disaster recovery site with other data from the primary data center; and
   in response to determining that the primary data center has failed:
      discarding each message for which a correspondence exists between the request message history and the transaction history; and
      instigating manual reconciliation of each message for which the correspondence between the request message history and the transaction history does not exist.

2. The method as claimed in claim 1, further comprising:
   in response to determining that the primary data center has failed, starting a reconciliation mode in which intercepted messages are not forwarded to the primary data center.

3. The method as claimed in claim 1, wherein the request message history is stored at the disaster recovery site.

4. The method as claimed in claim 1, further comprising:
   for each message that is processed by the primary data center, ensuring that processing the message updates the other data at the primary data center and the transaction history at the primary data center atomically.

5. The method as claimed in claim 1, wherein the request message history has a time record and wherein messages older than a predetermined age are removed from the request message history.

6. The method as claimed in claim 5, further comprising:
   carrying out a time-initiated process in the primary data center to delete old entries in the transaction history.

7. A system for message reconciliation during disaster recovery, the system comprising:
   a processor; and
   a memory coupled to the processor, wherein the memory comprises instructions which, when executed by the processor, cause the processor to:
   intercept a plurality of messages at a gateway component remote from a primary data center to which the messages are being sent;
   store a copy of each of the messages in a request message history that is remote from the primary data center;
   forward the messages to the primary data center;
   update a transaction history at the primary data center to indicate each message that has been processed by the primary data center, wherein the transaction history at the primary data center is mirrored to at least one storage device at a disaster recovery site with other data from the primary data center;
   in response to determining that the primary data center has failed, compare the request message history with the transaction history stored at the disaster recovery site; and
   carry out a time-initiated process in the primary data center to delete entries in the transaction history,
   wherein the request message history has a time record and messages older than a predetermined age are removed from the request message history.

8. The system as claimed in claim 7, wherein the instructions further cause the processor to:
   in response to determining that the primary data center has failed, start a reconciliation mode in which intercepted messages are not forwarded to the primary data center.

9. The system as claimed in claim 7, wherein the instructions cause the processor to compare the request message history with the transaction history stored at the disaster recovery site by causing the processor to:
   discard each message for which a correspondence exists between the request message history and the transaction history; and
   instigate manual reconciliation of each message for which the correspondence between the request message history and the transaction history does not exist.

10. The system as claimed in claim 7, wherein the request message history is stored at the disaster recovery site.

11. The system as claimed in claim 7, wherein the instructions further cause the processor to:
    for each message that is processed by the primary data center, ensure that processing the message updates the other data at the primary data center and the transaction history at the primary data center atomically.

12. A computer program product, comprising:
    a non-transitory computer readable storage medium having a computer readable program stored therein, wherein the computer readable program, when executed on a computing device, causes the computing device to:
    intercept a plurality of messages at a gateway remote from a primary data center to which the messages are being sent;
    store a copy of each of the messages in a request message history that is remote from the primary data center;
    forward the messages to the primary data center;
    update a transaction history at the primary data center to indicate each message that has been processed by the primary data center, wherein the transaction history at the primary data center is mirrored to at least one storage device at a disaster recovery site with other data from the primary data center; and in response to determining that the primary data center has failed:
  discard each message for which a correspondence exists between the request message history and the transaction history; and
  instigate manual reconciliation of each message for which the correspondence between the request message history and the transaction history does not exist.

13. The computer program product of claim 12, wherein the computer readable program further causes the computing device to:
  in response to determining that the primary data center has failed, start a reconciliation mode in which intercepted messages are not forwarded to the primary data center.

14. The computer program product of claim 12, wherein the request message history is stored at the disaster recovery site.

15. The computer program product of claim 12, wherein the computer readable program further causes the computing device to:
  for each message that is processed by the primary data center, ensure that processing the message updates the other data at the primary data center and the transaction history at the primary data center atomically.

16. The computer program product of claim 12, wherein the request message history has a time record, messages older than a predetermined age are removed from the request message history, and wherein the computer readable program further causes the computing device to:
  carry out a time-initiated process in the primary data center to delete old entries in the transaction history.

* * * * *